United States Patent Office 3,085,860
Patented Apr. 16, 1963

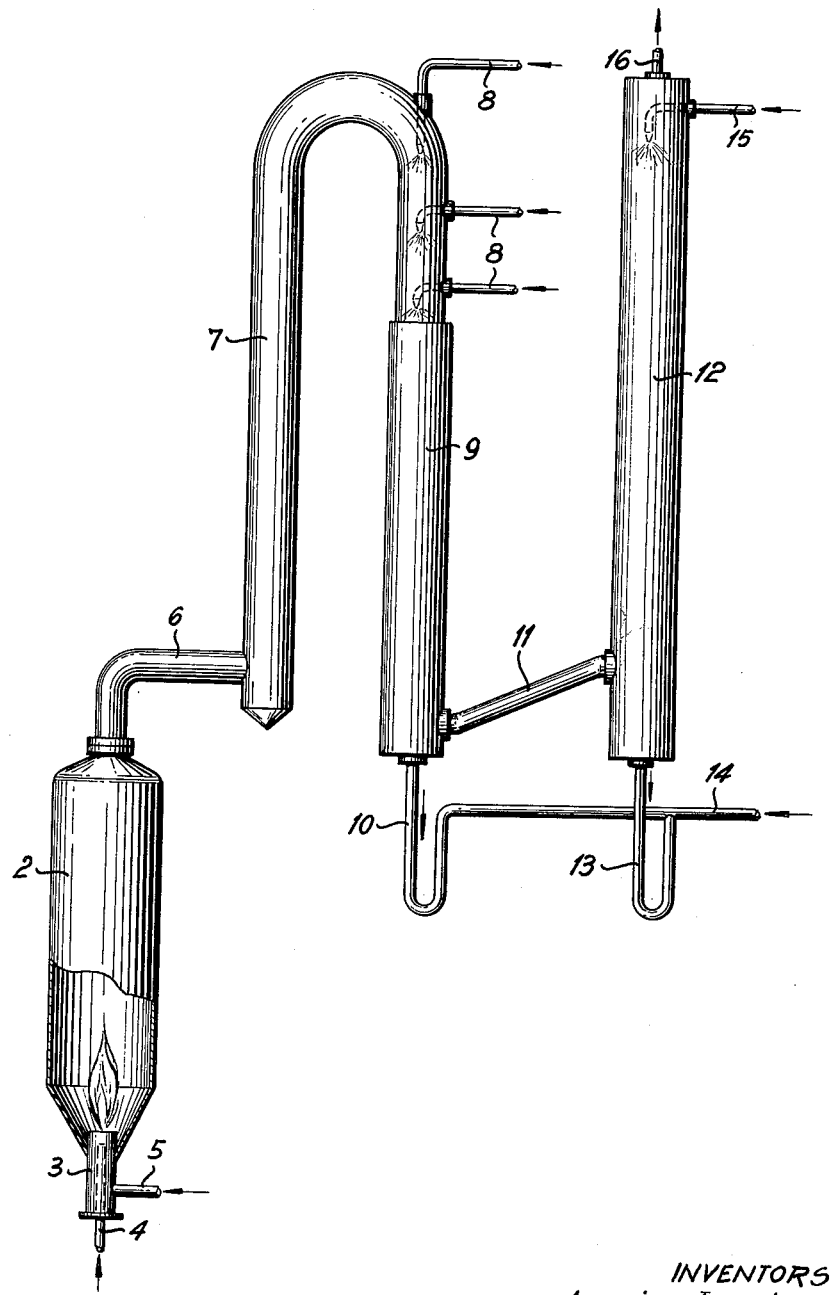

3,085,860
PROCESS FOR PREPARING HYDROGEN CHLORIDE
Armin Jacobowsky, Knapsack, near Cologne, and Fridolin Hartmann, Urfeld, near Bonn, Germany, assignors to Knapsack-Griesheim Aktiengesellschaft, Knapsack, near Cologne, Germany, a corporation of Germany
Filed July 20, 1961, Ser. No. 125,396
Claims priority, application Germany July 22, 1960
7 Claims. (Cl. 23—155)

The present invention provides a process for preparing hydrogen chloride or concentrated hydrochloric acid and describes an apparatus suitable for carrying out the process of the invention.

Attempts have already been made to replace the hydrogen used in the preparation of hydrogen chloride from chlorine and hydrogen by cheaper raw materials since pure hydrogen is often too expensive for the combustion of chlorine and has found other fields of application (hydrogenation).

It has first been tried to prepare hydrogen by the action of steam on heated coal, coke, charcoal or other carbon-containing substances according to the following equations:

$$C + H_2O = H_2 + CO - 32.454$$
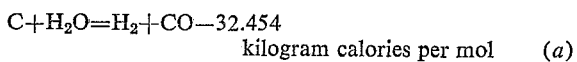
kilogram calories per mol (a)

and $$C + 2H_2O = 2H_2 + CO_2 - 24.610$$
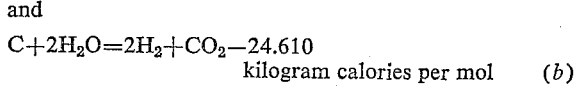
kilogram calories per mol (b)

and to react the hydrogen thus obtained with chlorine. These processes have a number of disadvantages which can be overcome by the process according to the present invention. The said disadvantages reside in the fact that:

(a) Due to the endothermic reaction energy is used for the heat production in the form of electric current, coal and carbon-containing products or gas for heating;

(b) Coal or carbon-containing substances are required as raw material;

(c) Catalysts such as iron oxides and iron-containing substances, porcelain, silica gel or coal in various form have to be used;

(d) The mineral constituents of the coal give rise to the formation of volatile chlorides and sulfur compounds which contaminate the hydrochloric acid;

(e) When coal is reacted slags remain behind in the reaction chamber;

(f) In some processes the CO formed according to Equation a given above is not utilized and has to be accounted as a loss;

(g) It is difficult to control the temperature of the waste gas.

Processes in which water gas that is rich in hydrogen is used as starting material and reacted with chlorine and steam are also known. However, the preparation of the required water gas which is a preliminary stage of the preparation of hydrogen chloride requires high cost of raw material and energy, for as it is known water gas is prepared from coal in any form or from carboniferous raw materials and the formation of water gas constitutes a strongly endothermic reaction.

Now we have found that in the preparation of hydrogen chloride the expensive water gas which consists of about 52% by volume of hydrogen and 40% by volume of carbon monoxide can be replaced by carbide furnace gas. The carbide furnace gas which forms during the preparation of carbide from lime and coke consists of about 15% by volume of hydrogen and 65% by volume of carbon monoxide and owing to its low calorie content it is often burnt away as a worthless byproduct forming in the production of carbide. It was unexpected and could not be foreseen that in the reaction the water gas could be replaced by carbide furnace gas which is much poorer in hydrogen and has a particularly high content of carbon monoxide. The carbide furnace gas excels water gas also in the fact that after passing over the layers of CaO in the carbide furnace it is almost completely free from sulfur and after the reaction yields a hydrochloric acid which is free from sulfur and which is urgently required for many purposes, for example, for the preparation of chlorides. In contradistinction thereto water gas contains up to 0.5% by weight of sulfur and yields hydrochloric acid having a corresponding content of sulfur.

When chlorine, carbide furnace gas and steam are burnt according to the invention in a lined steel furnace in the absence of a catalyst and without the supply of additional energy a complete conversion and a product exempt from sulfur and chlorine are attained in a simple manner under the conditions of the present invention.

The control of the high temperature of the gases coming from the furnace was for a long time a hindrance to the application of the process on an industrial scale. Now it has also been found that the corrosion which was observed and which had been produced by the hot waste gases containing hydrogen chloride and coming from the furnace can be completely avoided by introducing water or dilute, for example, azeotropic, hydrochloric acid through a nozzle spaced from the furnace into the path of the gas after the equilibrium of the reaction has been adjusted, the water or dilute hydrochloric acid being introduced in such a quantity that owing to evaporation the gas temperature suddenly drops and is less than 100° C.

Experiments have shown that quartz tubes arranged after the furnace and sprayed from the outside, packed absorption towers and tubular condensers are not resistant to the stress of temperature and corrosion in the long run whereas injection coolers can be used, without any substantial difficulties occurring.

The carbon monoxide contained in the carbide furnace gas reacts according to the following equation:

$$CO + H_2O = CO_2 + H_2 + 9.800$$
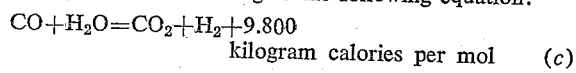
kilogram calories per mol (c)

whereupon the hydrogen which has formed and the small portion of hydrogen initially contained in the carbide furnace gas react with chlorine whereby hydrogen chloride is formed, the reaction proceeding according to the following equation:

$$H_2 + Cl_2 = 2HCl + 43.800$$
kilogram calories per mol (d)

Both reactions take place in the burner simultaneously and completely, so that hydrogen chloride is obtained which is free from chlorine and the yield amounts to 99.5 to 100%, calculated on the chlorine used.

It is not necessary that an excess of steam and carbide furnace gas is present. However, it is useful to ensure that a small excess of steam (1 to 7%) and carbide furnace gas (1 to 5%) is present in the furnace in order to compensate variations in the composition of the carbide furnace gas.

Depending on the lining of the furnace the temperature in the furnace adjusts itself within the range of 600° to 1300° C. In order to attain a complete conversion a furnace temperature of at least 560° C. is necessary. Such a temperature can be attained without difficulty owing to the great amount of heat set free during the process. In order to use smaller apparatus and to improve the absorption of hydrogen chloride the operation in the furnace may be conducted under pressure.

The process according to the invention has the following advantages over the known processes:

(a) It does not require an additional supply of energy;

(b) A cheap and often worthless raw material is used instead of expensive hydrogen;

(c) No catalysts are used;

(d) The hydrogen chloride is not contaminated by volatile chlorides and sulfur compounds;

(e) No slags form;

(f) No side reactions take place and consequently good yields, calculated on the chlorine used, are obtained;

(g) After the combustion in the furnace the gas temperature can be controlled in an unobjectionable manner.

An apparatus suitable for use in carrying out the process in accordance with the present invention is shown diagrammatically and by way of example only in the single FIGURE of the accompanying drawing.

A burner 3 which is charged with gaseous chlorine via an inlet pipe 4 and with steam and carbide furnace gas via an inlet pipe 5 projects into a chlorine combustion furnace 2. At the upper end a gas having a temperature within the range of 600° to 1300° C. and containing 62 to 66% by volume of hydrogen chloride leaves the combustion furnace 2 via a delivery pipe 6. In the descending part of an injection cooler 7 the gas is cooled to about 90° C. by means of water or dilute hydrochloric acid injected through nozzles and supplied via pipes 8. Subsequently the gas is cooled to 30° C. in a closed tubular cooler 9 made of graphite. The hydrogen chloride which has not yet been absorbed and issues via lower delivery pipe 11 is subsequently absorbed in a fall film absorber 12 by means of dilute hydrochloric acid or water introduced via an upper inlet pipe 15 and thereby converted into hydrochloric acid. The inert gases leave the absorber 12 at its head at 16. The hydrochloric acid obtained is free from sulfur and chlorine, has a high degree of purity and a concentration of 32 to 38%. It is drawn off via a delivery pipe 10 or via a delivery pipe 13 and conducted to a collecting pipe 14.

If desired, pure hydrogen chloride of 100% strength may be obtained from this hydrochloric acid by distillation for example by the process described in German Patent No. 955,412. The azeotropic hydrochloric acid forming in this case can be recycled and be used for the absorption of hydrogen chloride in the injection cooler 7 and the absorber 12.

Instead of carbide furnace gas containing about 65% by volume of carbon monoxide pure carbon monoxide of 100% strength may be reacted with chlorine and steam according to the same process to yield hydrogen chloride.

The following remarks are made with regard to the execution of the process of this invention.

Chlorine, steam and carbon monoxide are ignited while or after being mixed and converted into hydrogen chloride and carbon dioxide without the additional supply of energy and in the absence of a catalyst. The reaction components are advantageously mixed in a burner and the combustion takes place in a lined steel furnace. As carbon monoxide-containing component carbide furnace gas is in particular preferred in the process according to the invention. Steam as well as carbide furnace gas may be used in a slight excess, calculated on the chlorine used.

In the process according to the invention the temperature of the furnace is at least 560° C. and preferably within the range of 600° to 1300° C. After the furnace has once been heated to about 500° C. with carbide furnace gas and air no further quantities of energy need be supplied. The reaction may also be carried out under an elevated pressure of up to about 5 atmospheres (absolute). It has been found that the flame forming by the combustion of chlorine, steam and carbon monoxide or carbide furnace gas burns continuously even at a furnace temperature of 560° C. and yields hydrogen chloride which is free from chlorine. The flame itself has a temperature within the range of 1200° to 1300° C. Since the conversion is quantitative even at 560° C. it was possible to develop a furnace the lining of which is resistant to the thermal and chemical stress to which it is exposed.

According to another embodiment of the invention the reaction gases are cooled to temperatures below 100° C. by the injection of water or dilute, for example, azeotropic, hydrochloric acid and then used for the preparation of concentrated hydrochloric acid by way of absorption. The reaction gases may be cooled to the temperatures below 100° C. in one operation in an injection cooler into which water or dilute hydrochloric acid is atomized.

The concentrated hydrochloric acid which forms is distilled to yield pure hydrogen chloride and the azeotropic hydrochloric acid forming during the distillation is recycled and injected into the reacting gases for the purpose of cooling and of absorbing hydrogen chloride.

The following examples serve to illustrate the invention but they are not intended to limit it thereto.

EXAMPLE 1

(Carried Out on a Semi-Industrial Scale)

In a lined furnace having an internal diameter of 150 mm. and a height of 300 mm., which had once been preheated to 560° C., 30 kilograms of chlorine, 7.2 kilograms (=1.8% excess) of steam and 11.0 cubic meters (at N.T.P.) (=1% excess) of carbide furnace gas were introduced per hour. The carbide furnace gas introduced had the following composition 7% by volume of $H_2$
3% by volume of $CO_2$
80% by volume of $CO$
10% by volume of $N_2$ After the gas mixture had been ignited it burnt with a quiet flame, an average furnace temperature of 1020° C. adjusted itself and a gas left the furnace which had the following composition 0.0% by volume of $Cl_2$
65.0% by volume of $HCl$
0.1% by volume of $H_2$
30.8% by volume of $CO_2$
0.3% by volume of $CO$
3.8% by volume of $N_2$ Subsequently attempts were made to cool the waste gas in quartz tubes over which water was trickled, in a tubular cooler, or in a trickling tower charged with coke or packed with Raschig rings and cooled by recycling secondarily cooled hydrochloric acid. The attempts failed, however, because of the fissures caused by tension and the corrosion of the material. Besides, an acid was obtained which in general contained large portions of sulfur and iron.

In a final experiment cooling was carried out in a lined steel tube by injecting hydrochloric acid of 20.4% strength through a nozzle and the absorption was brought about in a graphite fall film absorber arranged after the steel tube by means of the same hydrochloric acid. In this case 201 kilograms of a hydrochloric acid of 32.6% strength, which was free from sulfur and chlorine were obtained per hour. The yield amounted to 100%, calculated on the chlorine used. The hydrochloric acid contained only 16 p.p.m. of iron and 1 p.p.m. of arsenic and could consequently be called very pure.

EXAMPLE 2

(Carried Out on an Industrial Scale)

A lined furnace having an internal diameter of 800 mm. and a height of 6000 mm. and which had once been preheated with carbide furnace gas and air to 600°

C. was charged per hour with 410 kilograms of chlorine, 90 kilograms (=1.5% excess) of steam and 170 cubic meters (at N.T.P.) (=3.5% excess) of carbide furnace gas. The carbide furnace gas which was introduced had the following composition:

14% by volume of $H_2$
6% by volume of $CO_2$
65% by volume of CO
15% by volume of $N_2$ After the gas mixture had been ignited it burnt with a quiet light blue flame, the average furnace temperature of 1100° C. adjusted itself and after the furnace a gas was obtained which had the following composition:

0.0% by volume of $Cl_2$
63.5% by volume of HCl
0.6% by volume of $H_2$
29.0% by volume of $CO_2$
0.7% by volume of CO
6.2% by volume of $N_2$ After the gas had been cooled in an injection cooler from 1100° C. to 90° C. and in a following tubular cooler from 90° C. to 30° C. and absorbed by means of water 1178 kilograms of a hydrochloric acid of 35.6% strength which was free from sulfur and chlorine were obtained per hour. The yield amounted to 99.8%, calculated on the chlorine. The hydrochloric acid had a high degree of purity (impurities: 0.1 p.p.m. of arsenic, 11 p.p.m. of iron).

EXAMPLE 3

*(Carried Out on a Semi-Industrial Scale)*

A lined furnace having an internal diameter of 180 mm. and an interior height of 3000 mm. and which had once been preheated to 560° C. was charged per hour with 30 kilograms of chlorine, 7.7 kilograms of steam (=1.2% excess) and 9.6 cubic meters (at N.T.P.) of carbon monoxide (=1.6% excess).

After the gas mixture had been ignited it burnt with a quiet flame, the average furnace temperature of 603° C. adjusted itself and a gas which was free from chlorine and which besides hydrogen chloride and carbon dioxide contained only traces of hydrogen and carbon monoxide left the furnace. (In a comparison test which was carried out under the same conditions, the only difference being that the furnace had a temperature of 536° C., 1.2% by volume of unreacted chlorine was determined.)

The gas leaving the furnace was cooled in an injection cooler to 87° C. by the injection of water through a nozzle and in a following tubular cooler to 27° C. and then absorbed by means of water in a fall film absorber. A hydrochloric acid of 36.2% strength and a high degree of purity (9 p.p.pm. of iron, less than 1 p.p.m. of arsenic) was obtained. The yield of hydrochloric acid amounted to 99.9% of the theoretical yield, the percentage being calculated on chlorine.

We claim:

1. A process for the non-catalytic preparation of hydrogen chloride which comprises igniting chlorine, steam and carbide furnace gas composed of carbon monoxide and hydrogen after they have been mixed whereby a gaseous mixture of hydrogen chloride and carbon dioxide are formed, and introducing the gaseous mixture into an aqueous medium in which only the hydrogen chloride is absorbed.

2. A process as claimed in claim 1 wherein chlorine, steam and carbon monoxide are ignited while they are mixed.

3. A process as claimed in claim 1 wherein the reactants are mixed in a burner.

4. A process as claimed in claim 1 wherein steam and carbide furnace gas are used in a slight excess with respect to the chlorine used.

5. A process as claimed in claim 3 wherein the furnace temperature is at least 560° C.

6. A process as claimed in claim 5 wherein the furnace temperature is within the range of about 600° to 1300° C.

7. A process as claimed in claim 1 wherein the reaction takes place under a pressure within the range of atmospheric pressure to a pressure of about 5 atmospheres (absolute).

References Cited in the file of this patent

UNITED STATES PATENTS

| | | |
|---|---|---|
| 1,366,176 | Harger et al. | Jan. 18, 1921 |
| 1,692,811 | Blake | Nov. 27, 1928 |
| 2,220,304 | Tracy | Nov. 5, 1940 |
| 2,330,440 | Maude | Sept. 28, 1943 |
| 2,545,314 | Seebold | Mar. 13, 1951 |

OTHER REFERENCES

The Journal of Industrial and Engineering Chemistry, vol. 12, No. 6 (June 1920), pages 538–541.